(12) United States Patent
Ugaji et al.

(10) Patent No.: US 8,187,755 B2
(45) Date of Patent: May 29, 2012

(54) ELECTRODE FOR ELECTROCHEMICAL ELEMENT, ITS MANUFACTURING METHOD, AND ELECTROCHEMICAL ELEMENT USING THE SAME

(75) Inventors: Masaya Ugaji, Osaka (JP); Keisuke Ohara, Osaka (JP); Kazuhiro Watanabe, Osaka (JP)

(73) Assignee: Panasonic Corporation, Osaka (JP)

( * ) Notice: Subject to any disclaimer, the term of this patent is extended or adjusted under 35 U.S.C. 154(b) by 852 days.

(21) Appl. No.: 12/160,973

(22) PCT Filed: Feb. 29, 2008

(86) PCT No.: PCT/JP2008/000394
§ 371 (c)(1),
(2), (4) Date: Jul. 15, 2008

(87) PCT Pub. No.: WO2008/136166
PCT Pub. Date: Nov. 13, 2008

(65) Prior Publication Data
US 2010/0190060 A1   Jul. 29, 2010

(30) Foreign Application Priority Data

Apr. 26, 2007   (JP) .................................. 2007-116932

(51) Int. Cl.
| | |
|---|---|
| H01M 4/76 | (2006.01) |
| H01M 4/13 | (2010.01) |
| H01M 4/58 | (2010.01) |
| B05D 5/12 | (2006.01) |

(52) U.S. Cl. ..................... 429/238; 429/233; 429/218.1; 427/58; 427/126.3

(58) Field of Classification Search ............... 429/218.1, 429/238, 233; 427/58, 126.3
See application file for complete search history.

(56) References Cited

U.S. PATENT DOCUMENTS

| | | | | |
|---|---|---|---|---|
| 7,195,842 | B1 * | 3/2007 | Fujimoto et al. | 429/209 |
| 7,781,101 | B2 * | 8/2010 | Okazaki et al. | 429/218.1 |
| 2003/0027050 | A1 | 2/2003 | Okamoto et al. | |
| 2006/0083987 | A1 | 4/2006 | Konishiike et al. | |
| 2006/0099507 | A1 * | 5/2006 | Kogetsu et al. | 429/218.1 |
| 2007/0031733 | A1 * | 2/2007 | Kogetsu et al. | 429/245 |

FOREIGN PATENT DOCUMENTS

| | | |
|---|---|---|
| JP | 2002-319408 | 10/2002 |
| JP | 2003-17040 | 1/2003 |
| JP | 2004-127561 | 4/2004 |
| JP | 2005-196970 | 7/2005 |
| JP | 2005-293899 | 10/2005 |
| JP | 2006-73212 | 3/2006 |
| JP | 2006-114454 | 4/2006 |
| JP | 2006-164954 | 6/2006 |
| JP | 2006-278104 | 10/2006 |

* cited by examiner

*Primary Examiner* — Patrick Ryan
*Assistant Examiner* — Julian Anthony
(74) *Attorney, Agent, or Firm* — McDermott Will & Emery LLP

(57) ABSTRACT

Having a current collector having a concave portion and a convex portion at least on one side, and a columnar body formed on the convex portion of the current collector, the columnar body contains an active material for inserting and extracting lithium ions bonding at least with oxygen, and the oxygen content ratio of the active material of the columnar body becomes smaller as going away from the interface of the current collector.

14 Claims, 9 Drawing Sheets

Discharge

Charge

ELECTRODE FOR ELECTROCHEMICAL ELEMENT, ITS MANUFACTURING METHOD, AND ELECTROCHEMICAL ELEMENT USING THE SAME

RELATED APPLICATIONS

This application is the U.S. National Phase under 35 U.S.C. §371 of International Application No. PCT/JP2008/000394, filed on Feb. 29, 2008, which in turn claims the benefit of Japanese Application No. 2007-116932, filed on Apr. 26, 2007, the disclosures of which Applications are incorporated by reference herein.

TECHNICAL FIELD

The invention relates to an electrochemical element excellent in charging and discharging characteristics, and more particularly to an electrode for electrochemical element excellent in capacity retaining rate, its manufacturing method, and an electrochemical element using the same.

BACKGROUND ART

Recently, as an electrochemical element, a lithium ion secondary battery represented by non-aqueous electrolyte secondary battery is widely used because it is light in weight, high in electromotive force, and high in energy density. For example, the demand for lithium secondary battery is increasing for use as driving power source for portable telephone, digital camera, video camera, laptop computer, and other various portable electronic devices and mobile communication appliances.

The lithium ion secondary battery is composed of a positive electrode made of composite oxide containing lithium, a negative electrode included lithium metal, lithium alloy or a negative electrode active material capable of inserting and extracting lithium ions, and an electrolyte.

Recently, instead of the conventional negative electrode material such as graphite and carbon material, new elements having a lithium ion inserting property and having a theoretical capacity density exceeding 833 mAh/cm$^3$ are reported. Elements of negative electrode active material and having a theoretical capacity density exceeding 833 mAh/cm$^3$ include silicon (Si), tin (Sn), and germanium (Ge) alloying with lithium, and their oxides and alloys. In particular, since particles containing silicon such as Si particles or silicon oxide particles are inexpensive, they have been widely studied.

These elements are, however, increased in the volume when inserting lithium ions in the charging process. For example, when Si is used as negative electrode active material, when lithium ions are inserted to a maximum extent, the compound is expressed as $Li_{4.4}Si$, and in the process of transforming from Si to $Li_{4.4}Si$, the volume is increased 4.12 times of discharged state.

In particular, when a negative electrode active material is formed by depositing a thin film of the element on the current collector by a CVD method or a sputtering method or the like, the negative electrode active material is expanded and contracted by inserting and extracting lithium ions. In the repeating period of charging and discharging cycles, the adhesion of the negative electrode active material and the negative electrode current collector is lowered, and peeling may occur.

To solve the problems, various methods have been proposed, such as a method of forming undulations on the surface of the current collector, depositing a thin film of negative electrode active material, and forming pores in the thickness direction by etching (see, for example, patent document 1). Other example is a method of forming undulations on the surface of the current collector, forming a resist pattern so that the convex portions may correspond to the opening, forming a thin film of negative electrode active material thereon electrolytically, and removing the resist to form columnar bodies (see, for example, patent document 2).

Another example is a method of forming a film of active material containing silicon and oxygen by varying the oxygen ratio on the surface of the current collector, and forming the film of active material layer higher in the oxygen ratio and smaller in expansion and contraction by insertion and extraction of lithium ions near the current collector (see, for example, patent document 3). As a result, expansion and contraction of active material layer at the interface of the current collector can be suppressed, and occurrence of creasing and pealing may be suppressed.

That is, in the secondary batteries disclosed in patent document 1 and patent document 2, a thin film of negative electrode active material is formed in columnar bodies, pores are formed among columnar bodies to prevent peeling or creasing. However, since the composition of columnar negative electrode active material is uniform, by insertion and extraction of lithium ions, the columnar thin film near the interface of the current collector is similarly expanded and contracted. As a result, as compared with the case of forming on the entire surface, the effect is suppressed, but a stress similarly occurs at the interface of columnar thin film and current collector, and peeling may occur, and substantial improvement of cycle characteristics is not expected. Further, in order to increase the battery capacity, if the height of the columnar thin film is increased and intervals of pores are narrowed, in particular, the leading end (open side) of the columnar thin film is not regulated by the current collector, and along with progress of charge, the columnar thin film is expanded largely as compared with the vicinity of the current collector. As a result, the columnar thin films mutually contact and push near the leading end, and peeling of columnar thin film from the current collector or creasing of current collector may occur. Therefore, both prevention of peeling of columnar thin film from the current collector or creasing of current collector and enhancement of battery capacity cannot be realized at the same time.

In the secondary battery of patent document 3, the active material layer is made of silicon and oxygen, and the oxygen ratio of active material layer near the interface of the current collector is heightened. As a result, occurrence of stress due to expansion and contraction of active material layer at the interface is suppressed. However, the active material layer apart from the interface of the current collector is expanded in its volume by insertion of lithium ions. By expansion of volume, the current collector may be creased or deformed. The leading end of the active material layer may be expanded, but the active material layer near the interface of the current collector is hardly expanded, and along with the progress of charging and discharging cycles, the active material layer may be torn or peeled. In particular, when the active material layer is increased in thickness, this effect becomes more obvious, and there is a problem for enhancement of capacity. In patent document 3, it is also proposed to form undulations on the surface of the current collector, and form an active material layer having undulations along the undulations, but essential the same problems exist.

Patent document 1: Unexamined Japanese Patent Publication No. 2003-17040

Patent document 2: Unexamined Japanese Patent Publication No. 2004-127561

Patent document 3: Unexamined Japanese Patent Publication No. 2006-164954

DISCLOSURE OF THE INVENTION

The electrode for electrochemical element of the present invention is an electrode for electrochemical element for inserting and extracting lithium ions reversibly, including a current collector having a concave portion and a convex portion at least on one side, and columnar body formed on the convex portion of the current collector, in which the columnar body contains an active material for inserting and extracting lithium irons bonding at least with oxygen, and the oxygen content ratio of active material of columnar body becomes smaller as going away from the interface of the current collector.

Accordingly, near the interface of the current collector, expansion and contraction due to insertion and extraction of lithium ions of the columnar body can be suppressed, and a high capacity is realized, and an electrode substantially improved in the charging and discharging cycle characteristics may be obtained. Since the columnar body is disposed discretely on the convex portions of the current collector, mutual contact of columnar bodies due to expansion of the leading end of columnar body may be alleviated, and crease of the current collector and peeling of columnar bodies from the current collector may be prevented. The space formed among the columnar bodies can insert and extract lithium entirely around the columnar bodies, and the move of the electrolytic solution is hardly disturbed. As a result, an electrode excellent in high-rate discharging and low temperature characteristics may be realized.

The manufacturing method of electrode for electrochemical element of the present invention is a manufacturing method of electrode for electrochemical element for inserting and extracting lithium ions reversibly, including a first step of forming a concave portion and a convex portion at least on one side of a current collector, and a second step of forming a columnar body containing an active material for inserting and extracting lithium ions bonding at least with oxygen, on the convex portions, having the oxygen content ratio of active material becoming smaller as going away from the interface of the current collector.

Accordingly, near the interface of the current collector, expansion and contraction due to insertion and extraction of lithium ions of the columnar bodies can be suppressed, and a high capacity is realized, and an electrode substantially improved in the charging and discharging cycle characteristics may be obtained.

The electrochemical element of the present invention has the electrode for electrochemical element described above, a counter electrode capable of inserting and extracting lithium ions reversibly, and a non-aqueous electrolyte. Hence, an electrochemical element high in safety and excellent in reliability is manufactured.

Figure 1:
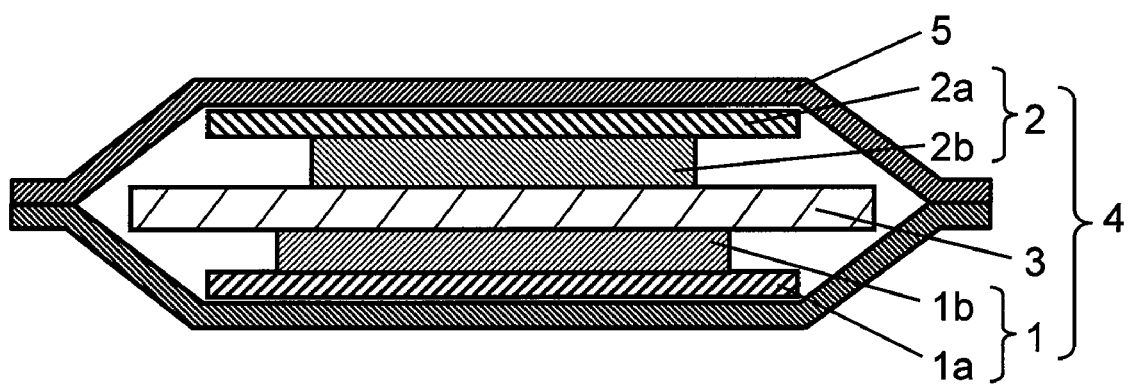
FIG. 1 is a sectional view of a non-aqueous electrolyte secondary battery in a first exemplary embodiment of the present invention.

| Description of the Reference Numerals and Signs | |
|---|---|
| 1, 25, 35 | Negative electrode (electrode for electrochemical element) |
| 1a, 11 | Current collector (negative electrode current collector) |
| 1b, 15, 25a, 35a | Columnar body |
| 2, 18 | Positive electrode (counter electrode) |
| 2a | Positive electrode current collector |
| 2b | Positive electrode mixture layer |
| 3 | Separator |

| | |
|---|---|
| | Description of the Reference Numerals and Signs |
| 4 | Electrode group |
| 5 | Outer case |
| 12 | Concave portion |
| 13 | Convex portion |
| 14 | Edge portion |
| 19 | Electrolytic solution (non-aqueous electrolyte) |
| 40 | Manufacturing apparatus |
| 41 | Vacuum chamber |
| 42 | Gas feed piping |
| 43 | Fixing table |
| 45 | Nozzle |
| 46 | Evaporation source |
| 47 | Vacuum pump |
| 151, 152, 153, 154, 155, 156, 157, 158 | Columnar body portion |

DETAILED DESCRIPTION OF PREFERRED EMBODIMENTS

Exemplary embodiments of the present invention are described below while referring to the accompanying drawings, in which same parts are identified with same reference numerals. The present invention is not particularly limited to the following description alone as far as conforming to the basic features mentioned herein in the present specification. The electrochemical element includes lithium ion secondary battery, other non-aqueous electrolyte secondary battery, lithium ion capacitor, and other capacity element. In the following explanation, the electrode for electrochemical element is a negative electrode for non-aqueous electrolyte secondary battery, the counter electrode is a positive electrode, and the electrochemical element is a non-aqueous electrolyte secondary battery, but the invention is not limited to these examples alone.

First Exemplary Embodiment

FIG. 1 is a sectional view of a non-aqueous electrolyte secondary battery in a first exemplary embodiment of the present invention.

As shown in FIG. 1, a laminated type non-aqueous electrolyte secondary battery (or merely battery) includes electrode group 4 having negative electrode 1 specifically described below, positive electrode 2 opposite to negative electrode 1 for reducing lithium ions in discharging process, and porous separator 3 interposed between them for preventing direct contact of negative electrode 1 and positive electrode 2. Electrode group 4 and an electrolyte (not shown) having lithium ion conductivity are accommodated in outer case 5. The electrolyte having lithium ion conductivity is impregnated in separator 3. One end of positive electrode lead (not shown) and negative electrode lead (not shown) is connected respectively to positive electrode current collector 2a and negative electrode current collector 1a, and other end is drawn out to outside of outer case 5. The opening of outer case 5 is sealed with a resin material. Positive electrode 2 is composed of positive electrode current collector 2a, and positive electrode mixture layer 2b supported on positive electrode current collector 2a.

As described specifically below, negative electrode 1 is composed of negative electrode current collector 1a (or merely current collector) having concave portions and convex portions, and columnar body 1b laminating and forming n stages ($n \geq 2$) of columnar body portions on the convex portions. At this time, odd-number stages and even-number stages of columnar body portions are formed from different directions. In the following explanation, the columnar body is formed of n=8 stages of columnar body portions, but the number is preferably $10 \leq n \leq 100$, more preferably $20 \leq n \leq 50$, from the viewpoint of productivity and characteristics. At this time, columnar body 1b is formed of an active material expressed as SiOx ($0 \leq x \leq 2$) containing at least silicon and partially bonded with oxygen. Columnar body 1b has columnar body portions larger in the average value of x expressing the oxygen content ratio near current collector 1a, for example, $1.0 \leq x \leq 2$, and smaller in the value of x as going away from current collector 1a, for example, $0 \leq x \leq 1.0$. The change of a value of x of columnar body 1b depends on the number of layers (n stages) of columnar body portions, but a continuous change is preferred because the stress at the interface of columnar body portions can be lessened effectively. However, to realize a high capacity, for example, the value of x of columnar body portions is changed abruptly in several layers near the current collector, and the value of x of columnar body portions laminated thereon may be defined, for example, $x \leq 0.2$, and thereby the inserting amount of lithium ions may be increased.

At this time, the changing direction of content ratio of elements for composing each columnar body portion may be set to be different between odd-number stages and even-number stages, for example, with respect to the plane direction of the current collector.

Here, positive electrode mixture layer 2b includes complex oxide containing lithium such as $LiCoO_2$, $LiNiO_2$, $Li_2MnO_4$, or a mixture or complex compound thereof as the positive electrode active material. As the positive electrode active material, olivine-type lithium phosphate expressed by a general formula of $LiMPO_4$ (M=V, Fe, Ni, Mn) or lithium fluorophosphates expressed by a general formula of $Li_2MPO_4F$ (M=V, Fe, Ni, Mn) may be used. A portion of the compound containing lithium may be replaced with a heteroelement. Surface treatment may be made by metal oxide, lithium oxide or a conductive agent or surface hydrophobic may be made.

Positive electrode mixture layer 2b further includes a conductive agent and a binder. As the conductive agent, graphite such as natural graphite or artificial graphite, carbon black such as acetylene black, Ketchen black, channel black, furnace black, lamp black or thermal black, conductive fibers such as carbon fiber or metal fiber, metal powder such as carbon fluoride or aluminum, conductive whisker such as zinc oxide or potassium titanate, conductive metal oxide such as titanium oxide, or an organic conductive material such as phenylene derivative may be used.

As the binder, for example, PVDF, polytetrafluoroethylene, polyethylene, polypropylene, aramid resin, polyamide, polyimide, polyamideimide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinylpyrrolidone, polyether, polyether sulfone, hexafluoropolypropylene, styrene-butadiene rubber, or carboxymethyl cellulose may be used. In addition, a copolymer of at least two selected from tetrafluoroethylene, hexafluoroethylene, hexafluoropropylene, perfluoroalkylvinyl ether, vinylidene fluoride, chlorotrifluoroethylene, ethylene, propylene, pentafluoropropylene, fluoromethyl vinyl ether, acrylic acid, and hexadiene may be used. A mixture of at least two selected therefrom may be used.

As positive electrode current collector 2a used in positive electrode 2, aluminum (Al), carbon or conductive resin may be used. One of these materials may be subjected to surface treatment by carbon or the like.

In the non-aqueous electrolyte, an electrolyte solution in which a solute is dissolved in an organic solvent or so-called polymer electrolyte layer which includes them and is non-fluidized with a polymer is applicable. If at least the electrolyte solution is used, the electrolyte solution is preferably impregnated to separator 3 of single layer or plural layers such as nonwoven fabric made of polyethylene, polypropylene, aramid resin, amideimide, polyphenylene sulfide or polyimide or microporous membrane between positive electrode 2 and negative electrode 1. Heat-resistant filler such as alumina, magnesia, silica or titania may be contained in separator 3 or in the surface of the separator. In additional of separator 3, a heat resistant layer made of the filler and the same binder as that used in positive electrode 2 and negative electrode 1 may be provided.

The non-aqueous electrolyte material is selected on the basis of an oxidation reduction potential of the active material. As the preferable solute used in the non-aqueous electrolyte, salt which is generally used in the lithium battery, such as $LiPF_6$, $LiBF_4$, $LiClO_4$, $LiAlCl_4$, $LiSbF_6$, LiSCN, $LiCF_3SO_3$, $LiNCF_3CO_2$, $LiAsF_6$, $LiB_{10}Cl_{10}$, lower aliphatic lithium carboxylate, LiF, LiCl, LiBr, LiI, borides such as chloroborane lithium, bis(1,2-benzene diolate(2-)—O,O') lithium borate, bis(2,3-naphthalene diolate (2-)—O,O') lithium borate, bis(2,2'-biphenyl diolate(2-)—O,O') lithium borate, bis(5-fluoro-2-olate-1-benzenesulfonic acid-O,O') lithium borate, $(CF_3SO_2)_2NLi$, $LiN(CF_3SO_2)(C_4F_9SO_2)$, $(C_2F_5SO_2)_2NLi$, or tetraphenyl lithium borate, may be used.

As the organic solvent for dissolving the salt, a mixture of at least one ethylene carbonate (EC), propylene carbonate, butylene carbonate, vinylene carbonate, dimethylene carbonate (DMC), diethyl carbonate, ethylmethyl carbonate (EMC), dipropyl carbonate, methyl formate, methyl acetate, methyl propionate, ethyl propionate, dimethoxymethane, γ-butyrolactone, γ-valerolactone, 1,2-diethoxyethane, 1,2-dimethoxyethane, ethoxymethoxyethane, trimethoxymethane, tetrahydrofuran, tetrahydrofuran derivative such as 2-methyltetrahydrofuran, dimethylsulfoxide, a dioxolan derivative such as 1,3-dioxolan, 4-methyl-1,3-dioxolan, formamide, acetamide, dimethylformamide, acetonitrile, propylnitrile, nitromethane, ethylmonoglyme, phosphate triester, acetate ester, propionate ester, sulfolane, 3-methylsulfolane, 1,3-dimethyl-2-imidazolidinone, 3-methyl-2-oxazolidinone, propylene carbonate derivative, ethyl ether, diethyl ether, 1,3-propane sultone, anisole, fluorobenzene may be applied to the solvent which is generally used in the lithium battery.

In addition, an additive such as vinylene carbonate, cyclohexylbenzene, biphenyl, diphenyl ether, vinyl ethylene carbonate, divinyl ethylene carbonate, phenyl ethylene carbonate, diaryl carbonate, fluoroethylene carbonate, catechol carbonate, vinyl acetate, ethylene sulfite, propane sultone, trifluoropropylene carbonate, dibenzofuran, 2,4-difluoroanisole, o-terphenyl, or m-terphenyl may be contained.

The non-aqueous electrolyte may be as a solid electrolyte by mixing the solute with a mixture of at least one of a polymer material such as polyethylene oxide, polypropylene oxide, polyphosphazene, polyaziridine, polyethylene sulfide, polyvinyl alcohol, polyvinylidene-fluoride, polyhexafluoropropylene. In addition, the non-aqueous electrolyte may be mixed with the organic solvent so as to be used in a gel shape. An inorganic material such as lithium nitride, lithium halide, lithium oxyacid salt, $Li_4SiO_4$, $Li_4SiO_4$—LiI—LiOH, $Li_3PO_4$—$Li_4SiO_4$, $Li_2SiS_3$, $Li_3PO_4$—$Li_2S$—$SiS_2$, or phosphorus sulfide compound may be used as the solid electrolyte.

If the gel non-aqueous electrolyte is used, the gel non-aqueous electrolyte may be interposed between negative electrode 1 and positive electrode 2 instead of separator 3. Alternatively, the gel non-aqueous electrolyte may be provided adjacent to separator 3.

As current collector of negative electrode 1, a metal foil such as stainless steel, nickel, copper, or titanium or a thin film of carbon or conductive resin may be used. Surface treatment may be made by carbon, nickel or titanium.

As the columnar body portion configuring columnar body 1b of negative electrode 1, an active material which reversibly inserts/extracts lithium ions such as silicon (Si) or tin (Sn) and has theoretical capacity density of more than 833 mAh/cm$^3$ may be used. If this active material is used, any one of elementary substance, an alloy, a compound, a solid solution and a complex active material including a silicon containing material or a tin containing material may be used and the effect of the present invention can be obtained. That is, as the silicon containing material, Si, $SiOx(0<x≦2.0)$, an alloy or compound in which a portion of Si is substituted with at least one element selected from a group including Al, In, Cd, Bi, Sb, B, Mg, Ni, Ti, Mo, Co, Ca, Cr, Cu, Fe, Mn, Nb, Ta, V, W, Zn, C, N, and Sn, or a solid solution may be used. As the tin containing material, $Ni_2Sn_4$, $Mg_2Sn$, SnOx (0<x<2.0), $SnO_2$, $SnSiO_3$, or LiSnO may be used.

The columnar body portion may be a single active material or may be configured by a plurality of active materials. As an example in which the columnar body portion is configured by the plurality of active materials, there are a compound containing Si, oxygen and nitrogen and a plurality of compounds containing Si and oxygen and different configuration ratios of Si and oxygen.

The negative electrode for non-aqueous electrolyte secondary battery (or merely negative electrode) in the first exemplary embodiment of the present invention is specifically described below by referring to FIG. 2A, FIG. 2B, FIG. 3A, and FIG. 3B. The following example relates to an example of negative electrode active material (or merely active material) containing at least silicon, expressed in SiOx $(0≦x≦2.0)$.

Figure 2A:
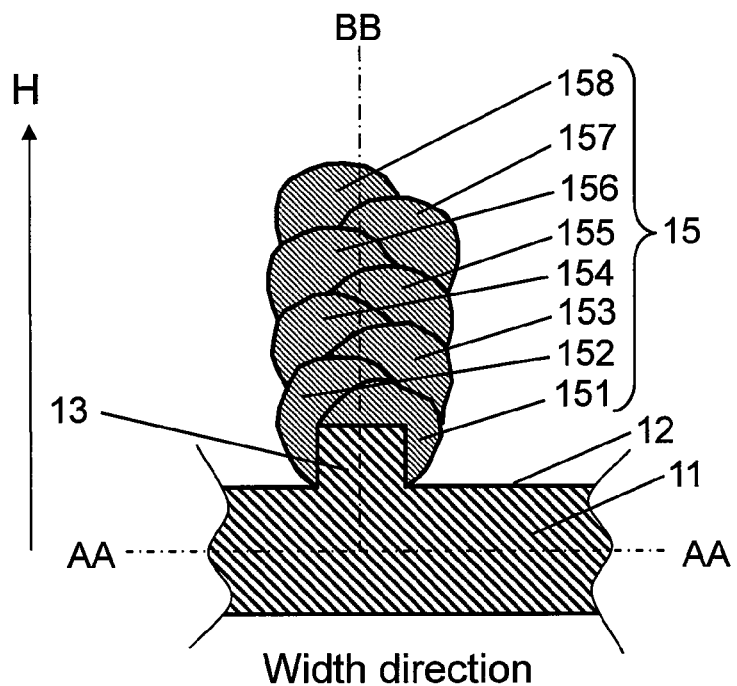
FIG. 2A is a partial sectional schematic diagram of structure of a negative electrode in the first exemplary embodiment of the present invention.
Figure 2B:
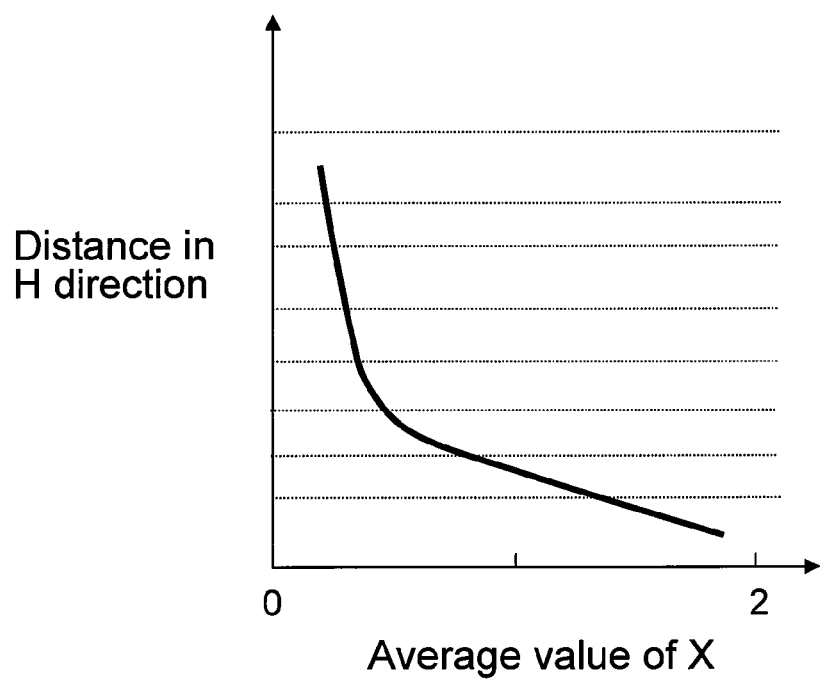
FIG. 2B is a schematic diagram explaining changes of a value of x in H direction of columnar bodies in the exemplary embodiment.

FIG. 2A is a partial sectional schematic diagram of structure of a negative electrode in the first exemplary embodiment of the present invention, and FIG. 2B is a schematic diagram explaining changes of a value of x in H direction of columnar bodies in the preferred embodiment. FIG. 2B shows changes of a value of x on line BB in FIG. 2A.

As shown in FIG. 2A, concave portion 12 and convex portion 13 are formed at least on the upper surface of current collector 11 made of a conductive metal material such as copper foil. In the upper part of convex portion 13, an active material expressed as SiOx composing columnar body 15 is formed in a shape of columnar body 15 formed of n stages (n≧2) of columnar body portions, in a folded state, by oblique deposition method such as sputtering method or vacuum deposition method. In FIG. 2A, for example, columnar body portions 151 to 158 are folded and formed in n=8 stages. At this time, the columnar body portions of odd-number stages and even-number stages for composing the columnar body are inclined obliquely and formed in different directions with respect to the plane direction (AA-AA) of current collector 11 in FIG. 2A. As a result, the convex portions of the current collector may be covered with a wide area, and the bond strength may be enhanced.

Columnar body portions, for example, 151 to 158, for composing columnar body 15 are formed as shown in FIG. 2B, in which the columnar body components are made of active materials having a different average oxygen content ratio expressed by the value of x. For example, in columnar body portion 151 to columnar body portion 153 near the interface of convex portions of current collector 11, the value of x is about 1.8 to 0.5, and in columnar body portion 154 to columnar body portion 158, the value of x is about 0.3 to 0. The concentration gradient of average oxygen content is defined in each stage if the number of stages of columnar body portions is many, and within the inside of each stage if the number of stages is small.

Figure 3A:
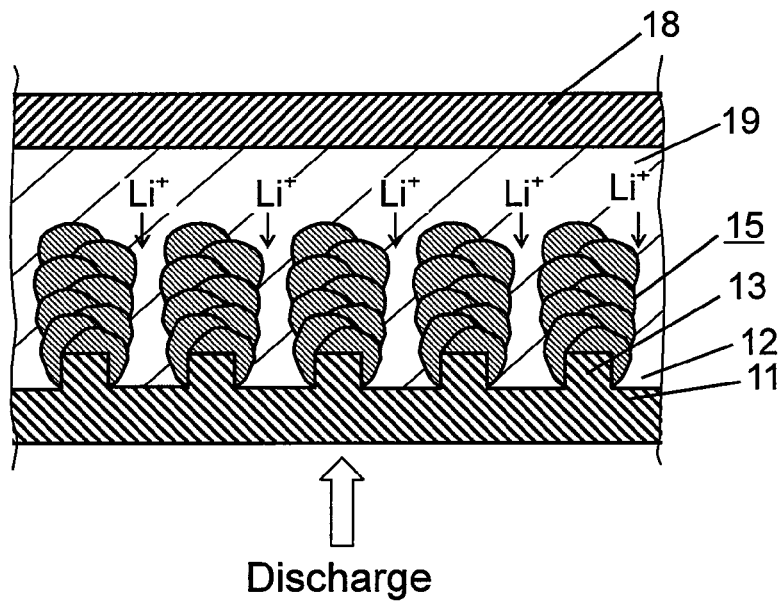
FIG. 3A is a partial sectional schematic diagram of detailed structure before charging of the negative electrode in the first exemplary embodiment of the present invention.
Figure 3B:
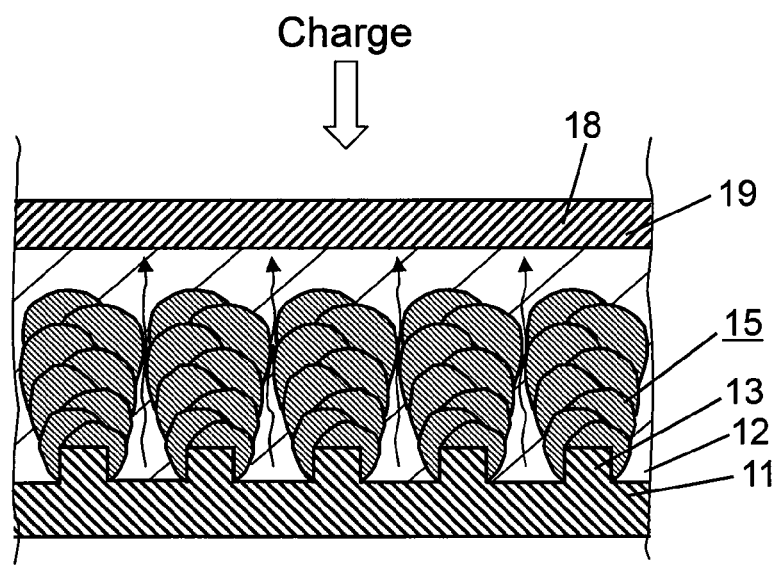
FIG. 3B is a partial sectional schematic diagram of detailed structure after charging of the negative electrode in the exemplary embodiment.

Referring now to FIG. 3A and FIG. 3B, the charging and discharging operation is explained about the columnar body formed of columnar body portions different in the average oxygen content ratio.

FIG. 3A is a partial sectional schematic diagram of detailed structure before charging of the negative electrode in the first exemplary embodiment of the present invention, and FIG. 3B is a partial sectional schematic diagram of detailed structure after charging of the negative electrode in the exemplary embodiment. FIG. 3A and FIG. 3B are shown in any reduction scale for the ease of understanding.

As shown in FIG. 3A, columnar body 15 inserts lithium ions moving in electrolytic solution 19 supplied from positive electrode 18 by its entire surface in an initial phase of charging.

Along with insertion of lithium ions, columnar body 15 is expanded. At this time, since columnar body portions 151, 152 forming columnar body 15 are large in the value of average oxygen content ratio x, and are small in expansion due to insertion of lithium ions. On the other hand, columnar body portions 153 to 158 are small in the value of average oxygen content ratio x, and are largely expanded due to insertion of lithium ions.

As a result, as shown in FIG. 3B, at the end of charging, columnar body portions 151, 152 are hardly changed in the volume, while columnar body portions 153 to 158 are increased in volume.

Hence, columnar body portions 151, 152 formed near the interface on convex portion 13 of current collector 11 are hardly expanded or contracted, and stress does not occur on the interface of current collector 11.

According to the present exemplary embodiment, by the columnar body formed of n stages of columnar body portions different in the average oxygen content ratio, stress due to expansion and contraction of columnar body portions near the interface of the current collector can be substantially decreased, and creasing of current collector and peeling from current collector can be prevented. As a result, a non-aqueous electrolyte secondary battery excellent in charging and discharging cycle characteristics and long-term stability can be realized.

Further, by composing the columnar body portions by an active material becoming smaller in the average oxygen content ratio (value of x) as departing from the current collector, a negative electrode of large inserting and extracting capacity of lithium ions and high capacity is realized. In particular, by increasing the average oxygen content ratio only in the columnar body portions near the current collector, and decreasing the average oxygen content ratio in the other columnar body portions, as compared with the columnar body portions equal in the average oxygen content ratio, the thickness (height) of the columnar body can be decreased, and the number of layers of electrode group and the number of turns can be increased, and a higher capacity is realized. At the same time, the thickness of columnar body can be decreased, and the productivity may be enhanced.

By decreasing the average oxygen content ratio of columnar body portions continuously as departing from the current collector, the stress due to difference in expansion and contraction between columnar body portions can be suppressed, and a negative electrode excellent in reliability is realized.

Since the columnar bodies are disposed discretely, lithium ions are inserted and extracted entirely on the entire columnar body except for the junction surface with the current collector, and a negative electrode excellent in high-rate characteristics and low temperature characteristics may be realized.

According to the present exemplary embodiment, while a high capacity is realized by using an active material large in expansion and contraction by insertion and extraction of lithium ions, in particular, by the negative electrode structure for substantially alleviating stress due to expansion and contraction of the current collector and the vicinity of interface of columnar body, a non-aqueous electrolyte secondary battery excellent in capacity retaining rate, high-rate characteristics and low temperature characteristics may be manufactured.

In the foregoing examples, the average oxygen content ratio x changed like a curve as shown in FIG. 2B, but this is not limited. It may be changed linearly or, for example, it may be changed to have flexion points.

The forming method of columnar body in a negative electrode for non-aqueous electrolyte secondary battery in the first exemplary embodiment of the present invention is described below, while referring to FIG. 4A to FIG. 4E and FIG. 5.

Figure 4A:
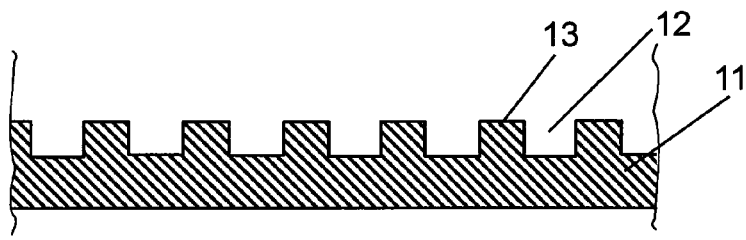
FIG. 4A is a partial sectional schematic diagram explaining a forming method of columnar bodies formed of n stages of columnar body portions of negative electrode for non-aqueous electrolyte secondary battery in the first exemplary embodiment of the present invention.
Figure 4B:
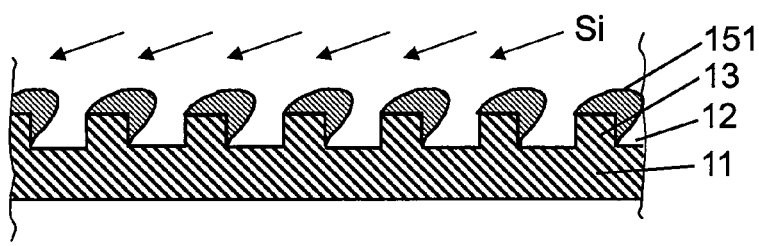
FIG. 4B is a partial sectional schematic diagram explaining a forming method of columnar bodies formed of n stages of columnar body portions of negative electrode for non-aqueous electrolyte secondary battery in the first exemplary embodiment of the present invention.
Figure 4C:
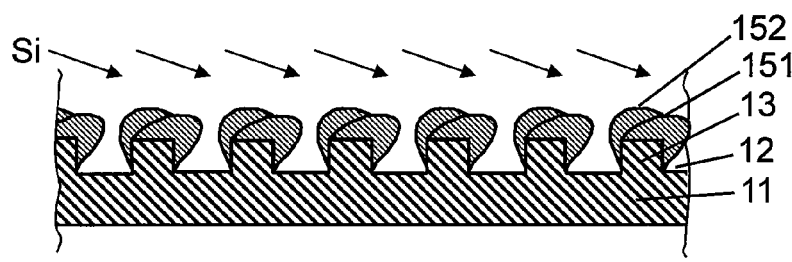
FIG. 4C is a partial sectional schematic diagram explaining a forming method of columnar bodies formed of n stages of columnar body portions of negative electrode for non-aqueous electrolyte secondary battery in the first exemplary embodiment of the present invention.
Figure 4D:
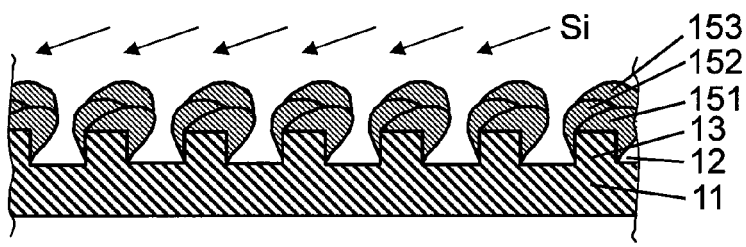
FIG. 4D is a partial sectional schematic diagram explaining a forming method of columnar bodies formed of n stages of columnar body portions of negative electrode for non-aqueous electrolyte secondary battery in the first exemplary embodiment of the present invention.
Figure 4E:
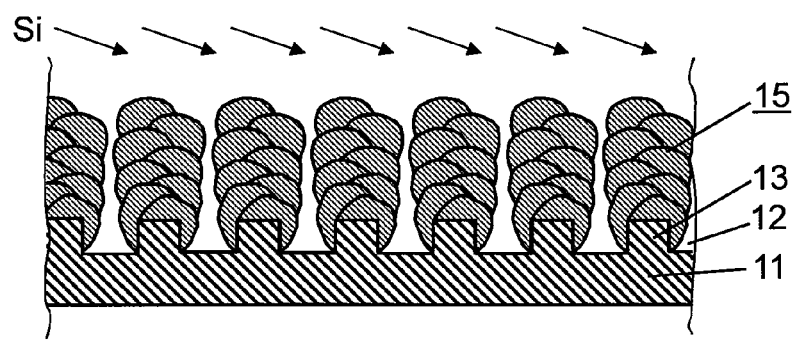
FIG. 4E is a partial sectional schematic diagram explaining a forming method of columnar bodies formed of n stages of columnar body portions of negative electrode for non-aqueous electrolyte secondary battery in the first exemplary embodiment of the present invention.
Figure 5:
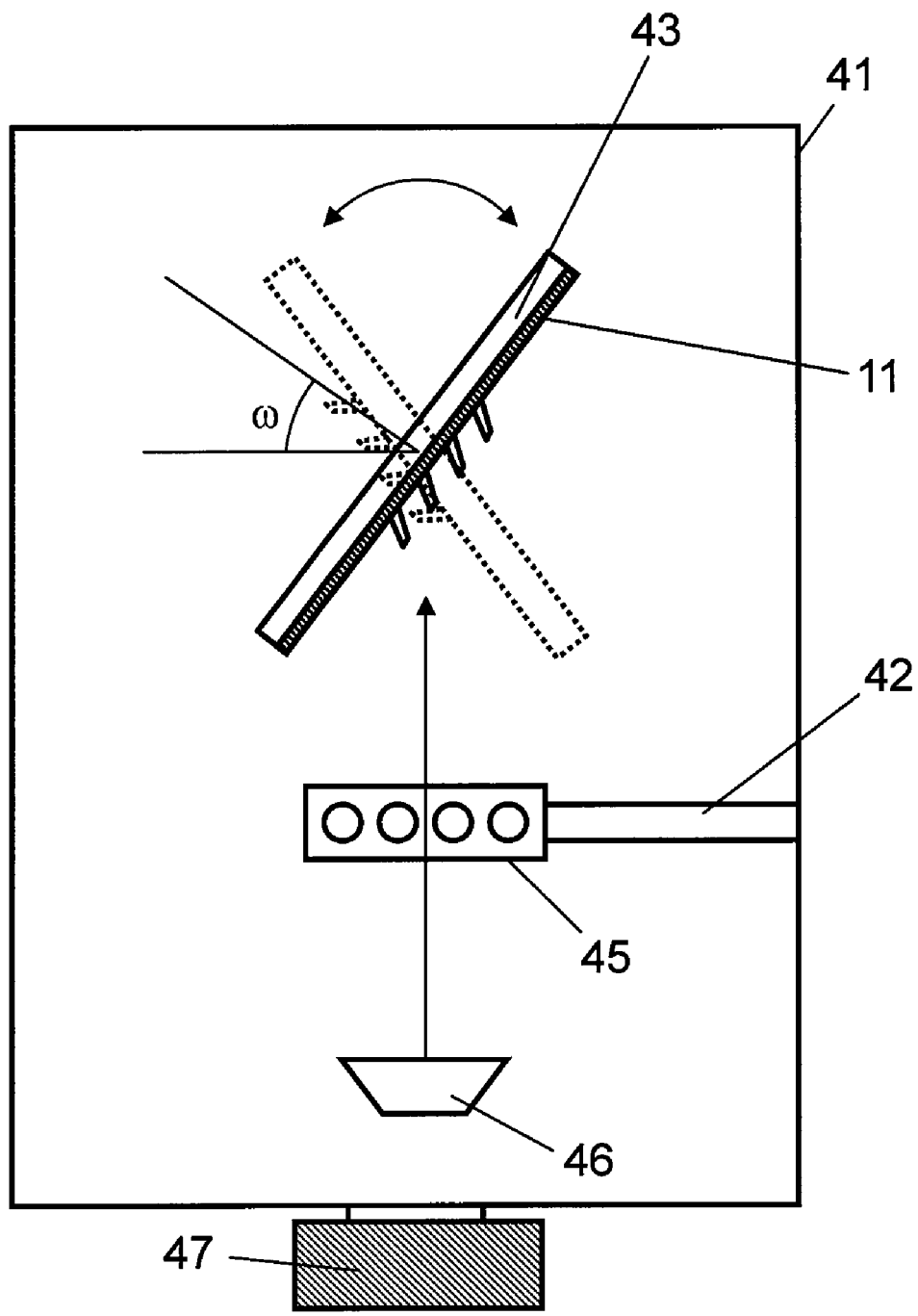
FIG. 5 is a schematic diagram explaining a manufacturing apparatus for forming a negative electrode for non-aqueous electrolyte secondary battery in the first exemplary embodiment of the present invention.

FIG. 4A to FIG. 4E are partial sectional schematic diagrams explaining a forming method of columnar bodies formed of n stages of columnar body portions of negative electrode for non-aqueous electrolyte secondary battery in the first exemplary embodiment of the present invention, and FIG. 5 is a schematic diagram explaining a manufacturing apparatus for forming a negative electrode for non-aqueous electrolyte secondary battery in the first exemplary embodiment of the present invention Manufacturing apparatus 40 for forming columnar bodies shown in FIG. 5 has vacuum chamber 41, which includes an electron beam (not shown) as heating means, gas feed piping 42 for feeding oxygen gas into vacuum chamber 41, and fixing table 43 for fixing the current collector, and it is designed to be evacuated by vacuum pump 47. Gas feed piping 42 has nozzle 43 for releasing oxygen gas into vacuum chamber 41, and fixing table for fixing the current collector is disposed above nozzle 45. Perpendicularly below fixing table 43, evaporation source 46 is disposed for forming columnar bodies on the surface of the current collector. Manufacturing apparatus 40 is capable of varying the configuration of current collector and evaporation source 46 by changing the angle of fixing table 43. That is, the oblique angle of each stage of columnar body formed of n stages is controlled by varying angle ω formed by normal direction and horizontal direction of surface of current collector by means of fixing table 43.

This manufacturing apparatus shows an example of manufacturing the columnar body by forming n stages of columnar body portions on one side of the current collector, but actually it is general to form columnar body on both sides of the current collector.

First, as shown in FIG. 4A and FIG. 5, using a band-like electrolytic copper foil of 30 μm in thickness, concave portion 12 and convex portion 13 are formed on the surface by plating method, and current collector 11 is prepared by forming convex portion 13, for example, in height of 7.5 μm, width of 10 μm, and interval of 20 μm. Current collector 11 is disposed on fixing table 43 as shown in FIG. 5.

Next, as shown in FIG. 4B and FIG. 5, on evaporation source 46, fixing table 43 is disposed at angle ω (for example, 60 degrees) to normal direction of current collector 11, and active material such as Si (scrap silicon: purity 99.999%) is heated and evaporated by an electron beam, and is entered into convex portion 13 of current collector 11 from arrow direction in FIG. 4B. At the same time, oxygen gas ($O_2$) is introduced from gas feed piping 42, and is supplied from nozzle 45 toward current collector 11. At this time, the inside of vacuum chamber 41 is an oxygen atmosphere of about pressure of $4\times10^{-2}$ Pa. As a result, an active material of SiOx obtained by bonding Si and oxygen, e.g. x=1.8, is formed as columnar body portion 151 of first stage of thickness (height) of 3 μm in oblique direction, for example at angle $\theta_1$ on convex portion 13 of current collector 11 disposed on fixing table 43 disposed at angle ω.

Next, as shown in FIG. 4C and FIG. 5, current collector 11 having columnar body portion 151 of first stage formed on convex portion 13 is disposed at position of angle (180−ω) (for example, 120 degrees) to normal direction of current collector 11 by rotating fixing table 43 as indicated by broken line in the drawing. From evaporation source 46, active material such as Si (scrap silicon: purity 99.999%) is evaporated, and entered into columnar body portion 151 of first stage of current collector 11 from the arrow direction in FIG. 4C. At the same time, oxygen gas ($O_2$) is introduced from gas feed piping 42, and supplied from nozzle 45 toward current collector 11. At this time, for example, the inside of vacuum chamber 41 is an oxygen atmosphere of about pressure of $2.7\times10^{-2}$ Pa. As a result, for example, the active material of SiOx obtained by bonding Si and oxygen, e.g. x=1.1, is formed on columnar body portion 151 of first stage at angle of $\theta_2$, and columnar body portion 152 of second stage of thickness (height) of 3 μm in oblique direction is formed on columnar body portion 151 of first stage.

As a result, the value of x of columnar body portion 152 of second stage is smaller than the value of x of columnar body portion 151 of first stage, and columnar body portion 151 of first stage and columnar body portion 152 of second stage are formed in different oblique directions and different oblique angles to the plane direction of current collector 11.

Next, as shown in FIG. 4D and FIG. 5, fixing table 43 is returned to the same state as in FIG. 4B. For evaporation source 46, fixing table 43 is disposed at angle ω (for example, 60 degrees) to the normal direction of current collector 11, and active material such as Si (scrap silicon: purity 99.999%) is heated and evaporated by an electron beam, and is entered into columnar body portion 152 of second stage of current collector 11 from arrow direction in FIG. 4D.

At the same time, oxygen gas ($O_2$) is introduced from gas feed piping 42, and is supplied from nozzle 45 toward current collector 11. At this time, the inside of vacuum chamber 41 is an oxygen atmosphere of about pressure of $1.3\times10^{-2}$ Pa. As a result, an active material of SiOx obtained by bonding Si and oxygen, e.g. x=0.5, is formed on columnar body portion 152 of second stage at angle of $\theta_3$, and columnar body portion 153 of third stage of thickness (height) of 3 μm in oblique direction is formed on columnar body portion 152 of second stage.

As a result, the value of x of columnar body portion 153 of third stage is smaller than the value of x of columnar body portion 152 of second stage, and columnar body portion 152 of second stage and columnar body portion 153 of third stage are formed in different oblique direction and different oblique angle to the plane direction of current collector 11. In this case, columnar body portion 151 of first stage and columnar body portion 153 of third stage are formed in same oblique direction.

As shown in FIG. 4E, by repeating the process of FIG. 4C and FIG. 4D, for example, by reducing oxygen partial pressure sequentially in the vacuum chamber 41, columnar body 15 composed of columnar body portions 153 to 158 is formed in a thickness (height) of 3 μm in oblique direction. For example, an active material of SiOx obtained by bonding Si and oxygen, e.g. x=0.3 to 0, is sequentially formed on columnar body portion 153 of third stage, that is, columnar body portions 154 to 158 in a thickness (height) of 3 μm in oblique direction. At this time, as shown in FIG. 2A and FIG. 2B, columnar body portions 151, 153, 155, 157 of odd-number stages and columnar body portions 152, 154, 156, 158 of even-number stages are gradually decreased in the value of x, and are formed in different oblique directions and different oblique angles. In columnar body portions 154 to 158, the columnar body may be formed without introducing oxygen.

Hence, negative electrode 1 having columnar body 15 composed of n=8 stages of columnar body portions can be manufactured.

In the foregoing example, the columnar body is composed of n=8 stages of columnar body portions, but it is not specified. For example, by repeating the process of FIG. 4C and FIG. 4D, the columnar body is composed of any desired number (n≧2) of stages of columnar body portions can be formed.

In this manufacturing apparatus, the columnar body is formed on the current collector of a specified size, but not limited to this example, the manufacturing apparatus can be composed freely. For example, a roll-shaped current collector may be disposed between the feed roll and take-up roll, and a plurality of film forming rolls may be disposed in series between them, and while moving the current collector in one direction, n stages of columnar bodies may be manufactured. Or after forming columnar bodies on one side of the current collector, the current collector may be inverted, and columnar bodies may be formed on the opposite side of the current collector. Hence, the negative electrode can be manufactured at high productivity.

Second Exemplary Embodiment

Figure 6A:
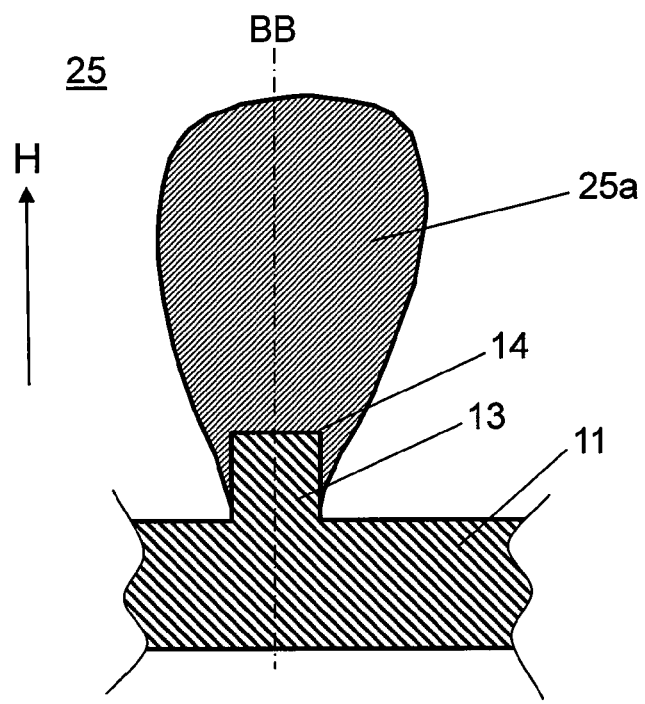
FIG. 6A is a partial sectional schematic diagram of structure of a negative electrode in a second exemplary embodiment of the present invention.
Figure 6B:
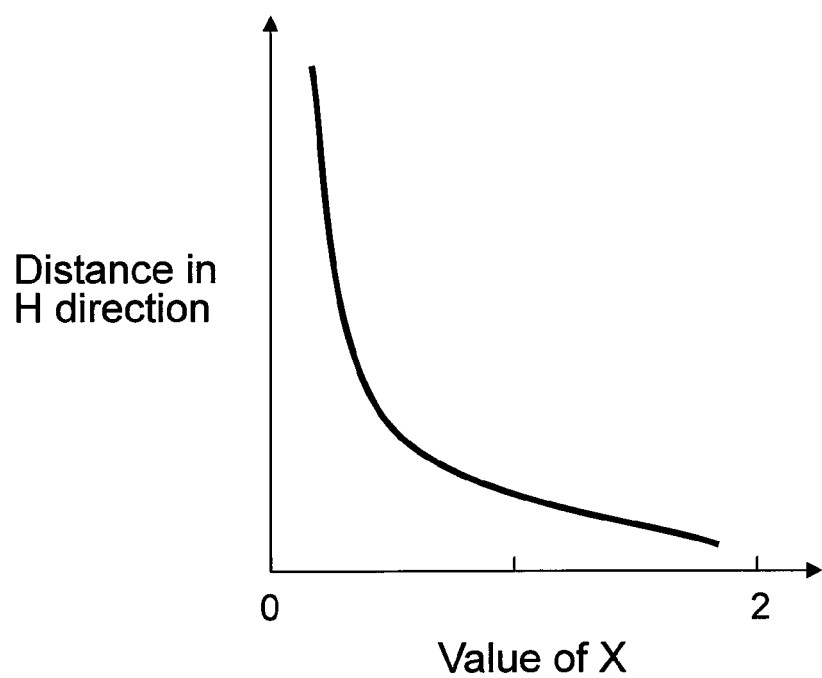
FIG. 6B is a schematic diagram explaining changes of a value of x in H direction of columnar bodies in the exemplary embodiment.

In a second exemplary embodiment of the present invention, a negative electrode is described by referring to FIG. 6A and FIG. 6B.

FIG. 6A is a partial sectional schematic diagram of structure of a negative electrode 25 in the second exemplary embodiment of the present invention, and FIG. 6B is a schematic diagram explaining changes of a value of x in H direction of columnar bodies 25a in the exemplary embodiment. In FIG. 6B, changes of the values of x on line BB in FIG. 6A are shown.

Second exemplary embodiment differs from negative electrode 1 in the first exemplary embodiment in that one columnar body 25a is provided in perpendicular direction on convex portion 13 of current collector 11. Other elements of the battery are same, and same elements are identified with same reference numerals in the following explanation.

That is, as shown in FIG. 6A, concave portion 12 and convex portion 13 are provided at least on upper surface of current collector 11 made of conductive metal material such as copper foil. In the upper part of convex portion 13, an active material composed of SiOx for composing negative electrode 25 is formed in a shape of columnar body 25a by using a film forming device such as heat plasma device or RF plasma device. At this time, columnar body 25a is grown from, for example, edge portion 14 of convex portion 13 of current collector 11, and is formed to envelop convex body 13 in perpendicular direction of convex portion 13. Columnar body 25a is formed to be smaller in average oxygen content ratio (value of x) as going away from near the interface of convex portion 13 as shown in FIG. 6B.

Hence, columnar body 25a near the interface of convex portion 13 of current collector 11 is hardly expanded and contracted, and stress does not occur at the interface of current collector 11.

According to the present preferred embodiment, by columnar body 25a differing in oxygen content ratio in thickness (height) direction, stress due to expansion and contraction of columnar body near the interface of current collector is substantially decreased, and occurrence of crease of current collector and peeling of columnar body from current collector can be prevented. As a result, a non-aqueous electrolyte secondary battery excellent in charging and discharging cycle characteristics and long-term stability can be realized.

Further, by decreasing the average oxygen content ratio (value of x) of columnar body as going away from the current collector, a negative electrode of large inserting and extracting amount of lithium ions and high capacity can be realized.

By forming the columnar body discretely, lithium ions can be inserted and extracted on the entire columnar body except for the junction surface with the current collector, and a negative electrode excellent in high rate characteristic and low temperature characteristic may be manufactured.

Besides, since the columnar body is formed to envelop the convex portion of the current collector, the bond area of the columnar body and current collector is wide, and the peel strength is further enhanced, and a negative electrode excellent in reliability is realized.

Figure 7:
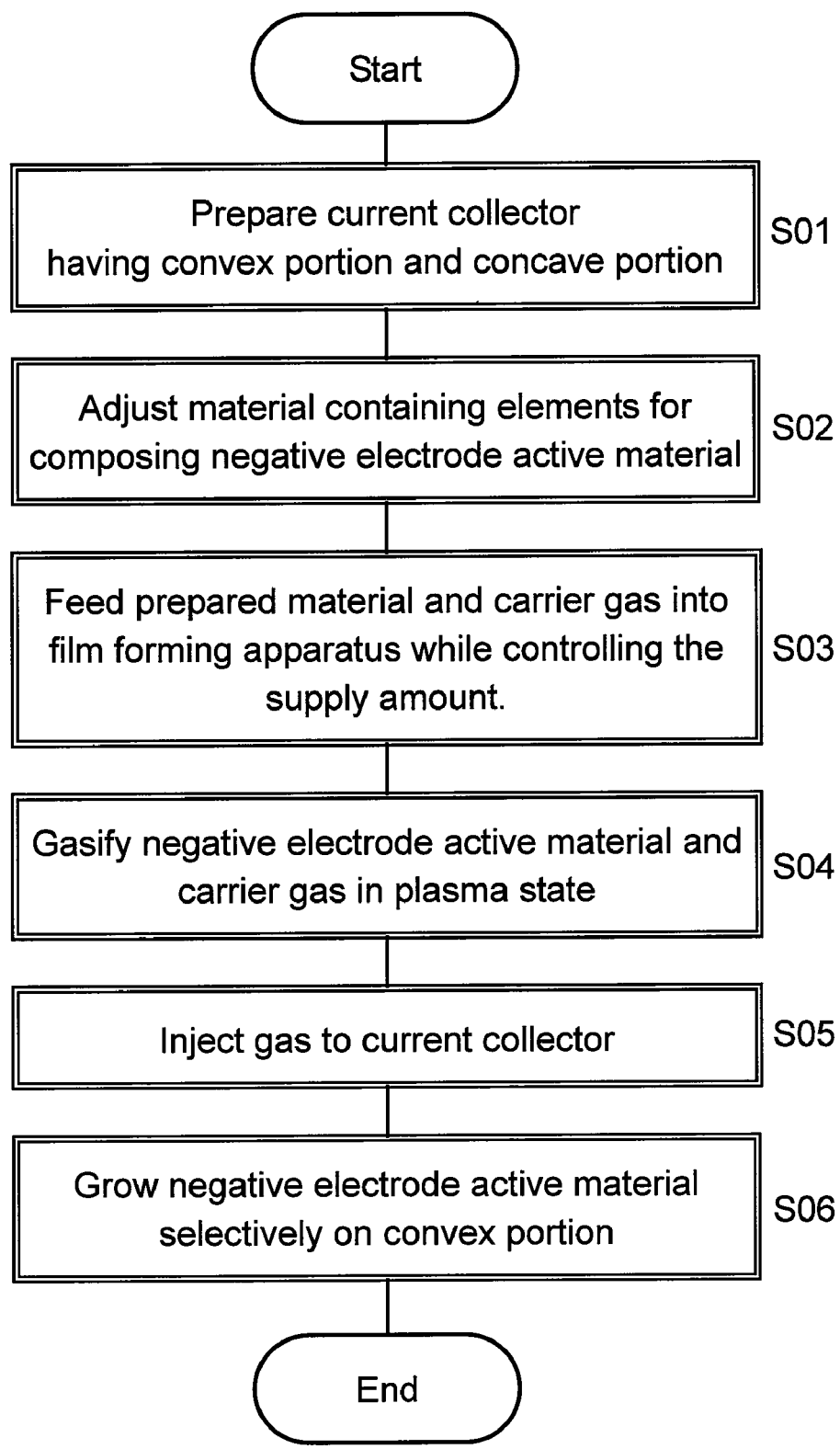
FIG. 7 is a flowchart explaining a manufacturing method for a negative electrode for non-aqueous electrolyte secondary battery in the second exemplary embodiment of the present invention.

A manufacturing method of negative electrode in the present preferred embodiment is explained below by referring to FIG. 7. FIG. 7 is a flowchart explaining a manufacturing method for forming a negative electrode for non-aqueous electrolyte secondary battery in the second exemplary embodiment of the present invention.

A film forming apparatus for forming columnar body 25a is an RF (radio frequency) plasma apparatus basically including a torch having a feed port for feeding carrier gas and active material and a coil for generating plasma, a stage for mounting a current collector, and an RF power source for supplying RF power to the coil.

First, as shown in FIG. 7, using a band-like electrolytic copper foil of 30 μm in thickness, concave portion 12 and convex portion 13 are formed on the surface by plating method, and current collector 11 forming convex portions 13 of height of 7.5 μm and width of 10 μm at intervals of 20 μm is prepared (step S01). The current collector is mounted on the stage.

An active material is prepared so as to adjust to a desired composition of the columnar body to be formed (step S02). At this time, for example, in the case of columnar body 15 made of SiOx having the value of x different in thickness direction, the mixture of silicon powder and silicon oxide is adjusted so that the value of x may be 1.8 to 0. In the upper part of columnar body 25a, the columnar body may be formed without feeding oxygen.

Along with growth of columnar body, adjusting the mixing rate of silicon powder and silicon, the active material is supplied from the feed port of the torch together with carrier gas such as argon (Ar) (step S03).

The active material and carrier gas supplied in the torch are gasified in plasma state at 8000 K to 10000 K, for example, by the RF power supplied in the coil (step S04). The active material gasified in plasma state is injected to current collector 11 on the stage from its normal direction (step S05). At this time, the active material is cooled to thousands of K near the current collector, and collected hundreds to thousands of pieces, so that they formed a cluster, and adheres to the convex portion (not shown) of the current collector cooled to temperature of about hundreds degrees of centigrade on the contact surface with the stage.

As a result, the active material is selectively grown on the convex portion of the current collector, and a columnar body different in the oxygen content ratio in the thickness direction is formed (step S06).

This is an example of forming the columnar body on the convex portion of the current collector, but the invention is not limited to this example alone. For example, same as in preferred embodiment 1, by using a vacuum deposition apparatus or sputtering apparatus, a mask having an opening may be provided at a forming position of columnar body, and the columnar body may be formed discretely on a flat current collector. Or, without using mask, after forming an active material layer differing in the value of x on the entire current collector, the columnar body may be formed discretely, for example, by etching. At this time, along with growth of columnar body in thickness direction, for example, the partial pressure of oxygen in the vacuum chamber must be changed. This method is preferred when the value of x of the columnar body is large only in the vicinity of the interface of the current collector and the value of x is small in the remaining parts of the columnar body. Hence, not requiring complicated process or expensive apparatus, the negative electrode can be manufactured inexpensively and at high productivity.

Third Exemplary Embodiment

A negative electrode in a third exemplary embodiment of the present invention is described below by referring to FIG. 8A and FIG. 8B.

Figure 8A:
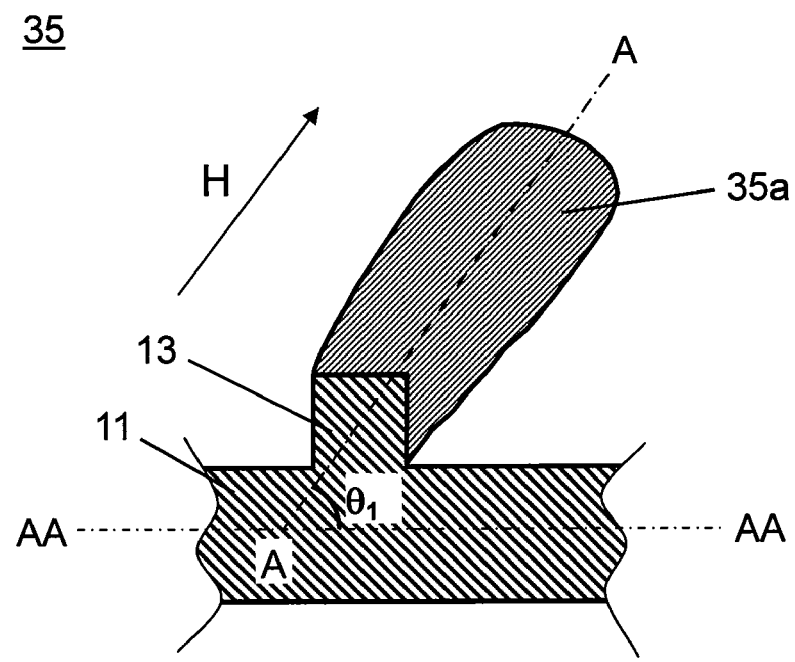
FIG. 8A is a partial sectional schematic diagram of structure of a negative electrode in a third exemplary embodiment of the present invention.
Figure 8B:
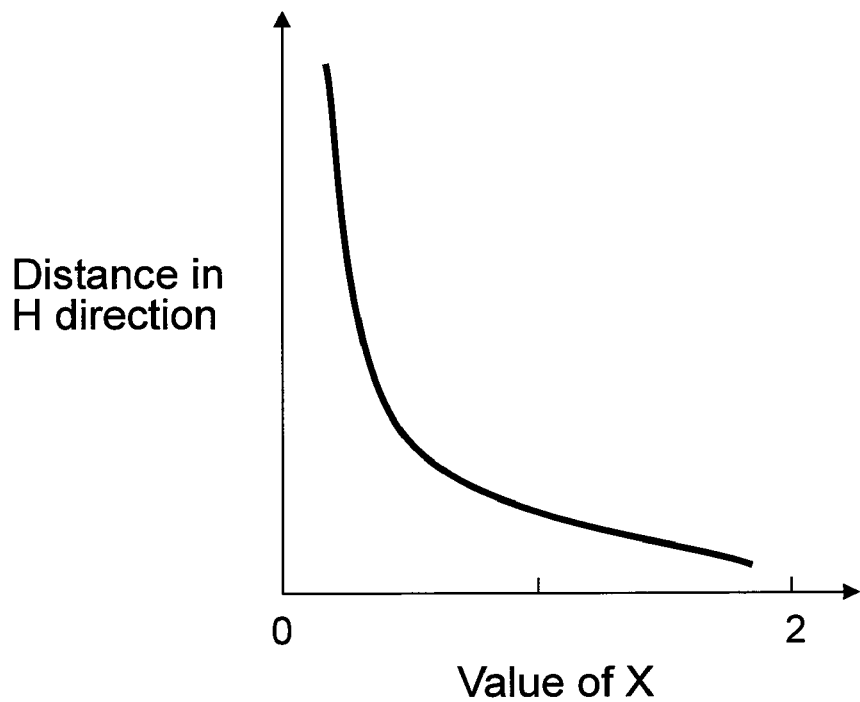
FIG. 8B is a schematic diagram explaining changes of a value of x in H direction of columnar bodies in the exemplary embodiment.

FIG. 8A is a partial sectional schematic diagram of structure of negative electrode 35 in the third exemplary embodiment of the present invention, and FIG. 8B is a schematic diagram explaining changes of a value of x in H direction of columnar body 35a in the exemplary embodiment. In FIG. 8B, changes of the value of x on line A-A in FIG. 8A are shown.

Third exemplary embodiment is different from negative electrode 25 of the second exemplary embodiment in that one columnar body 35a is formed obliquely on convex portion 13 of current collector 11. Basically, the columnar body portion of first stage in the first exemplary embodiment is formed largely as one columnar body. The other structure of the battery is same, and same components are identified with same reference numerals in the following explanation. The manufacturing apparatus is same as in FIG. 5, and FIG. 5 is also referred to.

As shown in FIG. 8A and FIG. 5, using a band-like electrolytic copper foil of 30 μm in thickness, concave portion 12 and convex portion 13 are formed on the surface by a plating method, and current collector 11 forming convex portions 13 of height of 7.5 μm and width of 10 μm at intervals of 20 μm is prepared. Current collector 11 is mounted on fixing table 43 shown in FIG. 5.

As shown in FIG. 5, consequently, on evaporation source 46, fixing table 43 is disposed at an angle ω (for example, 60 degrees) to a normal direction of current collector 11, and an active material such as Si (scrap silicon: purity 99.999%) is heated and evaporated by electron beam, and is injected onto convex portion 13 of current collector 11. At the same time, oxygen gas ($O_2$) is introduced from gas feed piping 42, and is supplied from nozzle 45 to current collector 11. At this time, the oxygen partial pressure in vacuum chamber 41, for example, is changed continuously or gradual steps, along with the growth of columnar body 35a, from $4\times10^{-2}$ Pa to $4\times10^{-3}$ Pa. As a result, the active material of SiOx obtained by bonding Si and oxygen, e.g. x=1.8 to 0, is changed and formed in the thickness direction of the columnar body. In the upper part of columnar body 35a, a columnar body may be formed without supplying oxygen. On convex portion 13 of current collector 11 disposed on fixing table 43 disposed at angle ω, columnar body 35a of thickness of 14 μm in oblique direction is formed at angle of $\theta_1$. That is, columnar body 35a is formed so that the oxygen content ratio (value of x) may be smaller departing from near the interface of convex portion 13 as shown in FIG. 8B.

According to the present exemplary embodiment, same effects as in the negative electrode of the second exemplary embodiment are obtained, and since columnar body 35a is formed obliquely, the rate of metal surface of concave portion 12 of current collector 11 exposed to the positive electrode is reduced, and precipitation of lithium metal on the metal surface of current collector 11 in initial phase of charging can be suppressed, and a negative electrode of high reliability is realized.

This is an example of forming the columnar body on the convex portion of the current collector, but the invention is not limited to this example alone. For example, same as in the first exemplary embodiment, by using a vacuum deposition apparatus or sputtering apparatus, a mask having an opening may be provided at a forming position of columnar body, and an oblique columnar body may be formed discretely by disposing a flat current collector obliquely to an evaporation source. At this time, the mask must be disposed on the current collector at a clearance of at least the thickness of the columnar body. Hence, not requiring complicated process or expensive apparatus, the negative electrode can be manufactured inexpensively and at high productivity.

In the present exemplary embodiment, as the electrode for electrochemical element, an example of negative electrode for non-aqueous electrolyte secondary battery is shown, but the invention is not limited to this example. For example, same effects are obtained when applied to a capacity element by using in an electrode for lithium ion capacitor.

The present invention is more specifically described below by referring to embodied examples. The present invention is not limited to these embodied examples alone, but may be modified or changed in materials within a scope not departing from the true spirit of the present invention.

Embodied Example 1

By using the manufacturing apparatus shown in FIG. 5, a negative electrode having a columnar body formed of 35 stages of columnar body portions was manufactured.

First, as a current collector, by a plating method, a band-like electrolytic copper foil of 30 μm in thickness was used by forming concave portions on its surface at height of 7.5 μm, width of 10 μm, and intervals of 20 μm.

As an active material for negative electrode, Si was used, and oxygen gas of purity of 99.7% was injected from nozzle 45 into a vacuum chamber by using an evaporation unit (an assembled unit of evaporation source, crucible, and electron beam generating device), and a columnar body portion of a first stage of SiOx of x=1.8, for example, was manufactured. At this time, the internal pressure of the vacuum chamber was an oxygen atmosphere of $4\times10^{-2}$ Pa. At the time of evaporation, the electron beam generated by the electron beam generating device was deflected by a deflection yoke, and emitted to the evaporation source. The evaporation source was formed of an end material produced at the time of forming a semiconductor wafer (scrap silicon: purity 99.999%).

At this time, the columnar body portion of first stage was formed, for example, at height of 0.4 μm at film forming speed of about 8 nm/s by adjusting the angle ω of the fixing table to 60 degrees.

In the forming method explained in preferred embodiment 1, the oxygen partial pressure in the vacuum chamber was gradually decreased, changed continuously from x=1.8 to x=0.2, and columnar body portions of n stages, first stage to seventh stage, were formed at each height of 0.4 μm and total height of 2.8 μm.

Further, similarly, columnar body portions of n stages, eighth stage to thirty-fifth stage, were formed at oxygen partial pressure in the vacuum chamber of $4\times10^{-3}$ Pa, at average oxygen content ratio of x=0.2, and, for example, at each height of 0.4 μm and total height of 11.2 μm.

As a result, a columnar body was manufactured by laminating 35 stages of columnar body portions at a height of 14 μm by varying from x=1.8 near the current collector to x=0.2.

The angle of the columnar body in the negative electrode to the central line of the current collector was evaluated by cross-section observation by using scanning electron microscope (S-4700 of Hitachi), and the oblique angle of columnar body portion of each stage was about 41 degrees. At this time, the thickness (height) of columnar body was 14 μm.

Using an electron beam probe micro-analyzer (EPMA), the oxygen distribution was investigated by measuring the linear distribution in normal direction of current collector of the columnar body portion of each stage for composing the columnar body of the negative electrode, and in the height direction of each columnar body portion, the average oxygen content ratio (value of x) changed from x=1.85 to x=0.24.

Thus, a negative electrode having a columnar body of 35 stages of columnar body portions formed on the convex portion of the current collector was obtained.

Later, Li metal of 10 μm was evaporated on the surface of negative electrode by vacuum deposition method. Further, at the inner peripheral of the negative electrode, an exposed portion was provided at copper (Cu) foil not opposite to the positive electrode, and a negative electrode lead made of Cu was welded.

Next, a positive electrode having a positive electrode active material capable of inserting and extracting lithium ions was manufactured in the following method.

A positive electrode active material, 93 parts by weight of $LiCoO_2$ powder, was mixed with 4 parts by weight of acetylene black as conductive agent. This powder was mixed with a binder, N-methyl-2-pyrrolidone (NMP) solution of polyvinylidene fluoride (PVDF) (for example, product #1320 of Kureha Kagaku), so that the weight of PVDF may be 3 parts by weight. A proper amount of NMP was added to this mixture, a paste for positive electrode mixture was prepared. This paste for positive electrode mixture was applied on both sides of the current collector by doctor blade method, that is, on the positive electrode current collector (thickness 15 μm) made of aluminum (Al) foil, and rolled to the density of 3.5 g/cc and thickness of 160 μm of positive electrode mixture layer, and dried sufficiently at 85° C., and cut, and a positive electrode was obtained. At the inner peripheral of the positive electrode, an exposed portion was provided at Al foil not opposite to the negative electrode, and a positive electrode lead made of Al was welded.

The manufactured negative electrode and positive electrode were laminated by way of a separator of porous polypropylene of 25 μm in thickness, and an electrode group of 40 mm×30 mm square was manufactured. The electrode group was impregnated in electrolytic solution, a mixed solution of ethylene carbonate/diethyl carbonate of $LiPF_6$, and accommodated in an outer case (material: aluminum), and the opening of the outer case was sealed, and a laminated battery was manufactured. The design capacity of the battery was 21 mAh. This is sample 1.

Embodied Example 2

The columnar body was formed of n=20 stages of columnar body portions, changing from x=1.8 to x=0.2 continuously in n=first stage to fourth stage, at each height of 1.7 μm and total height of 6.8 μm, and at average oxygen content ratio x=0.2 in n=fifth stage to twentieth stage, at each height of 0.7 μm and total height of 11.2 μm.

In the same manner as in the embodied example 1 except that the above-described, a negative electrode having a columnar body of 20 stages of columnar body portions on the convex portion of the current collector was manufactured.

The oblique angle of columnar body portion of each stage was about 41 degrees, and the thickness (height) of the formed columnar body was 14 μm.

Using EPMA, the oxygen distribution was investigated by measuring the linear distribution in normal direction of current collector of the columnar body portion of each stage for composing the columnar body of the negative electrode, and in the height direction of each columnar body portion, the average oxygen content ratio (value of x) changed from x=1.85 to x=0.24.

In the same manner as in the embodied example 1 except that the above negative electrode was used, a non-aqueous electrolyte secondary battery was manufactured as sample 2.

Embodied Example 3

The columnar body was formed of n=70 stages of columnar body portions, changing from x=1.8 to x=0.2 continuously in n=first stage to fourteenth stage, at each height of 0.2 μm and total height of 2.8 μm, and at average oxygen content ratio x=0.2 in n=fifteenth stage to seventieth stage, at each height of 0.2 μm and total height of 11.2 μm.

In the same manner as in the embodied example 1 except that the above-described, a negative electrode having a columnar body of 70 stages of columnar body portions on the convex portion of the current collector was manufactured.

The oblique angle of columnar body portion of each stage was about 41 degrees, and the thickness (height) of the formed columnar body was 14 μm.

Using EPMA, the oxygen distribution was investigated by measuring the linear distribution in normal direction of current collector of the columnar body portion of each stage for composing the columnar body of the negative electrode, and in the height direction of each columnar body portion, the average oxygen content ratio (value of x) changed from x=1.85 to x=0.24.

In the same manner as in the embodied example 1 except that the above negative electrode was used, a non-aqueous electrolyte secondary battery was manufactured as sample 3.

Comparative Example 1

By using the manufacturing apparatus shown in FIG. 5, a negative electrode having an active material layer on the entire surface of the current collector was manufactured.

First, as a current collector, a band-like electrolytic copper foil of 30 μm in thickness free from convex portion or concave portion on the surface was used.

As an active material for negative electrode, Si was used, and oxygen gas of purity of 99.7% was injected from nozzle 45 into a vacuum chamber by using an evaporation unit (an assembled unit of evaporation source, crucible, and electron beam generating device), and an active material layer of SiOx of x=0.2, for example, was manufactured. At this time, the internal pressure of the vacuum chamber was an oxygen atmosphere of $4 \times 10^{-3}$ Pa. At the time of evaporation, the electron beam generated by the electron beam generating device was deflected by a deflection yoke, and emitted to the evaporation source. The evaporation source was formed of an end material produced at the time of forming a semiconductor wafer (scrap silicon: purity 99.999%).

At this time, the active material layer was formed, for example, at height of 6 μm at film forming speed of about 8 nm/s by adjusting the angle ω of the fixing table to 0 degree.

Using EPMA, the oxygen distribution was investigated by measuring the linear distribution in normal direction of current collector of the active material layer of the negative electrode, and it was uniform in the height direction, and the average oxygen content ratio (value of x) was x=0.2.

Thus, a negative electrode having the active material layer on the current collector was manufactured.

Further, on the negative electrode surface, Li metal of 5 μm was evaporated by vacuum deposition method. Also, at the inner peripheral of the negative electrode, an exposed portion was provided at Cu foil not opposite to the positive electrode, and a negative electrode lead made of Cu was welded.

In the same manner as in the embodied example 1 except that the above negative electrode was used, a non-aqueous electrolyte secondary battery was manufactured as sample C1.

Comparative Example 2

By using the manufacturing apparatus shown in FIG. 5, a negative electrode having an active material layer on the entire surface of the current collector was manufactured.

First, as a current collector, a band-like electrolytic copper foil of 30 μm in thickness free from convex portion or concave portion on the surface was used.

As an active material for negative electrode, Si was used, and an active material such as Si (scrap silicon: purity 99.999%) was heated and evaporated by an electron beam, using an evaporation unit (an assembled unit of evaporation source, crucible, and electron beam generating device), and was emitted to the convex portion 13 of the current collector 11. As the same time, oxygen gas ($O_2$) was injected from gas feed piping 42, and supplied from nozzle 45 toward current collector 11. At this time, along with the growth of the active material layer, the oxygen partial pressure inside vacuum chamber 41, for example, was changed continuously or gradual steps from $4 \times 10^{-2}$ Pa to $4 \times 10^{-3}$ Pa. As a result, changing from x=1.8 to x=0.2 in thickness direction of SiOx obtained by bonding Si and oxygen, an active material layer was formed.

At this time, the active material layer was formed, for example, at height of 12 μm at film forming speed of about 8 nm/s by adjusting the angle ω of the fixing table to 0 degree.

Thus, an active material layer of 12 μm in thickness, varying from x=1.8, near the current, to x=0.2 collector was manufactured.

Using EPMA, the oxygen distribution was investigated by measuring the linear distribution in normal direction of current collector of the active material layer of the negative electrode, and in the height direction of the active material layer, the average oxygen content ratio (value of x) changed from x=1.85 to x=0.24.

Thus, a negative electrode having the active material layer on the current collector was manufactured.

Further, on the negative electrode surface, Li metal of 11 μm was evaporated by vacuum deposition method. Also, at the inner peripheral of the negative electrode, an exposed portion was provided at Cu foil not opposite to the positive electrode, and a negative electrode lead made of Cu was welded.

In the same manner as in the embodied example 1 except that the above negative electrode was used, a non-aqueous electrolyte secondary battery was manufactured as sample C2.

Comparative Example 3

First, as a current collector, a band-like electrolytic copper foil of 30 μm in thickness forming convex portions on the surface at width of 10 μm, height of 7.5 μm, and intervals of 20 μm was used, and a columnar body of 12 μm in height was formed in the same manner as in comparative example 1, except that the columnar body of 30 stages of columnar body portions on the convex portion was used.

Using EPMA, the oxygen distribution was investigated by measuring the linear distribution in normal direction of current collector of the active material layer of the negative electrode, and the average oxygen content ratio (value of x) was uniform in the height direction, and it was x=0.2.

Thus, a negative electrode having a columnar body of 30 stages of columnar body portions on the convex portion of the current collector was manufactured.

Further, on the negative electrode surface, Li metal of 11 μm was evaporated by vacuum deposition method. Further, at the inner peripheral of the negative electrode, an exposed portion was provided at Cu foil not opposite to the positive electrode, and a negative electrode lead made of Cu was welded.

In the same manner as in the embodied example 1 except that the above negative electrode was used, a non-aqueous electrolyte secondary battery was manufactured as sample C3.

The non-aqueous electrolyte secondary batteries thus manufactured were evaluated as follows.

First, the battery capacity was measured.

The non-aqueous electrolyte secondary batteries were charged and discharged in the following conditions at ambient temperature of 25° C.

At design capacity (21 mAh), the battery was charged at constant current of hour rate 1.0 C (21 mA) up to battery voltage of 4.2 V, and at constant voltage of 4.2 V, the battery was charged at constant voltage until damping to current value of hour rate 0.05 C (1.05 mA). The operation was then suspended for 30 minutes after charging.

Then, at current value of hour rate 0.2 C (4.2 mA), the battery was discharged at constant current until the battery voltage declined to 3.0 V.

This operation is one cycle, and the discharge capacity at third cycle was defined as battery capacity.

The charging and discharging cycle characteristics are explained.

Each non-aqueous electrolyte secondary battery was charged and discharged repeatedly in the following condition at ambient temperature 25° C.

At design capacity (21 mAh), the battery was charged at constant current to battery voltage of 4.2 V at hour rate 1.0 C (21 mAh), and was charged until the charge current was lowering to a current value of time constant 0.05 C (10.05 mA) at constant voltage of 4.2 V. The operation was then suspended for 30 minutes after charging.

The battery was then discharged at constant current until the battery voltage was lowered to 3.0 V at current value of hour rate 0.2 C (4.2 mA). The operation was then suspended for 30 minutes after discharging.

One cycle of this charging and discharging was repeated 500 times. The rate of discharge capacity at 500th cycle as compared with the discharge capacity at first cycle was expressed in percentage as capacity retaining ratio (%). That is, as the capacity retaining rate is closer to 100, the charging and discharging cycle characteristic is excellent.

The ratio of discharge capacity at 0.2 C (4.2 mA) discharge as compared with the charge capacity was expressed in percentage as charge and discharge efficiency (%). The ratio of discharge capacity at high-rate discharge of 1.0 C (21 mA) as compared with the discharge capacity at 0.2 C (4.2 mA) discharge was expressed in percentage as high-rate ratio (%).

The capacity retaining ratio, charge and discharge efficiency, and the high-rate ratio were measured at 10th cycle and 500th cycle.

The electrode status is explained.

After discharging 100 cycles, using X-ray CT (Shimadzu Microfocus SMX-225CTf), the battery was photographed in exposure conditions of voltage of 190 kV and current of 80 μA, and the cross section of the battery was observed. The status of the negative electrode was evaluated by observing peeling or dropping of active material or columnar body from the current collector, and creasing or deformation of current collector.

Specifications and evaluation results of sample 1 to sample 3, and sample C1 to sample C3 are shown in Table 1 and Table 2.

TABLE 1

|  | n (stages) | Thickness of First columnar body portion (μm) | Thickness of columnar body (μm) | Average oxygen content ratio of SiOx (in height direction of active material layer) |
| --- | --- | --- | --- | --- |
| Sample 1 | 35 | 0.4 | 14 | 1.85~0.24 |
| Sample 2 | 20 | 0.7 | 14 | 1.85~0.24 |
| Sample 3 | 70 | 0.2 | 14 | 1.85~0.24 |
| Sample C1 | 1 | 6 | 6 | 0.2 |
| Sample C2 | 1 | 12 | 12 | 1.85~0.24 |
| Sample C3 | 30 | 0.4 | 12 | 0.2 |

TABLE 2

|  | Cycles (times) | Charge and discharge efficiency (%) | High-rate ratio (%) | Capacity retaining ratio (%) | Status of electrode |
| --- | --- | --- | --- | --- | --- |
| Sample 1 | 10 | 99.8 | 93 | 100 | Free of crease |
|  | 500 | 99.8 | 88 | 81 |  |
| Sample 2 | 10 | 99.8 | 93 | 100 | Free of crease |
|  | 500 | 99.8 | 87 | 78 |  |
| Sample 3 | 10 | 99.8 | 93 | 100 | Free of crease |
|  | 500 | 99.8 | 88 | 82 |  |
| Sample C1 | 10 | 99.8 | 93 | 100 | Having crease |
|  | 500 | 99.2 | 81 | 43 |  |
| Sample C2 | 10 | 99.8 | 93 | 100 | Having crease |
|  | 500 | 99.2 | 83 | 52 |  |
| Sample C3 | 10 | 99.8 | 93 | 100 | Free of crease |
|  | 500 | 99.2 | 81 | 45 |  |

Figure 9:
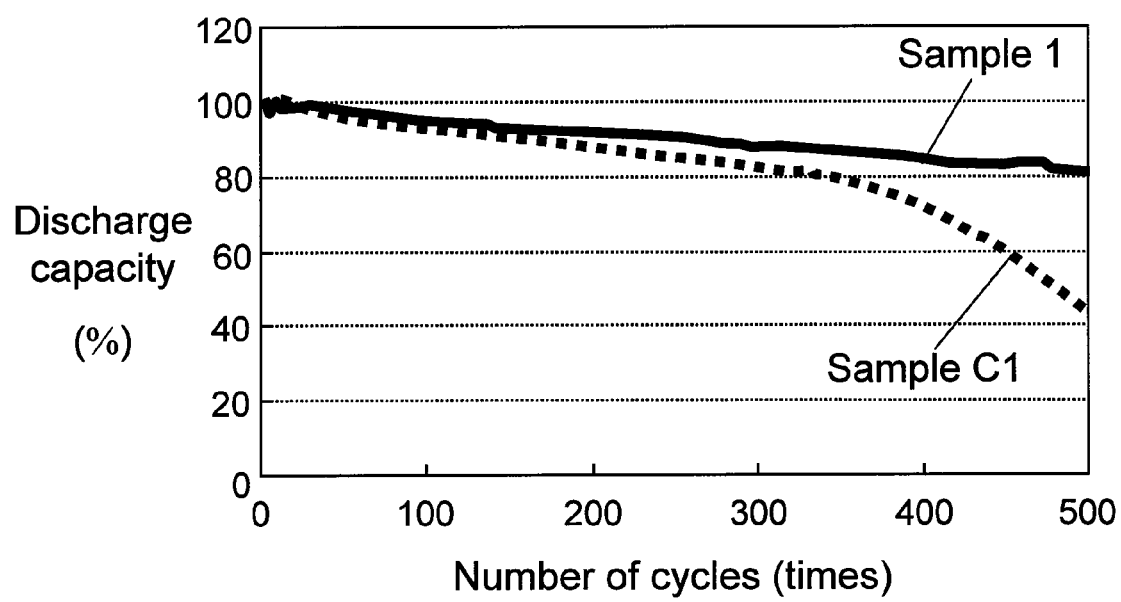
FIG. 9 is a diagram showing an example of charging and discharging cycle characteristics in samples of an exemplary embodied example and a comparative example.

FIG. 9 shows evaluation results of sample 1 and sample C1 as an example of charging and discharging cycle characteristics.

As shown in Table 1 and Table 2, comparing sample C1 and sample C2, there was no difference in charge and discharge efficiency or high-rate ratio depending on the number of cycles. But sample C2 was slightly improved in the capacity retaining ratio as compared with sample C1. It is considered because sample C2 was changed in the average oxygen content ratio from the interface of the current collector of the active material layer, and was hence suppressed in expansion and contraction near the interface of the current collector. However, since the active material layer was formed on the entire surface of the current collector, creasing or deformation was found in the current collector more or less.

In comparison between sample C1 and sample C3, there was no difference in charge and discharge efficiency, high-rate ratio, or capacity retaining ratio depending on the number of cycles. In sample C3, however, since the columnar body is formed discretely on the current collector, creasing or other deformation of current collector was not observed.

In sample 1 to sample 3 of the exemplary embodiments of the present invention, there was almost no difference in charge and discharge efficiency, high-rate ratio, or capacity retaining ratio depending on the number of cycles. However, since the columnar body portion is formed of 70 stages, considering the controllability of productivity, thickness of each columnar body portion, or average oxygen content ratio, the number of stages of columnar body portions seems to be preferable at about 50 stages.

As a result, as shown in Table 1, Table 2 and FIG. 9, when sample 1 is compared with sample C1 to sample C3, effects of merely changing the average oxygen content ratio in the active material layer, effects of forming the columnar body discrete, and extra effects of combining these effects were obtained in the present invention. In particular, the capacity retaining ratio was increased by about 2 times, and it is expected to realize a dramatic improvement of performance for extension of life.

In the embodied examples, the characteristics of samples using the negative electrodes of the second exemplary embodiment and the third exemplary embodiment are not particularly shown. However, in these samples, too, although there is a slight difference in capacity retaining ratio as compared with the columnar body formed of a plurality of columnar body portions, excellent characteristics far from sample C1 to sample C3 were obtained. The negative electrodes in these exemplary embodiments of the present invention may be preferably selected in consideration of the desired characteristics, cost and productivity.

As explained in the embodied examples, by using the negative electrode of the present invention having the columnar body formed of a plurality of columnar body portions formed on the convex portion of the current collector, and gradually decreased in the average oxygen content ratio from the vicinity of the interface of the current collector, a non-aqueous electrolyte secondary battery outstandingly improved in characteristics such as deformation of electrode or capacity retaining ratio can be realized.

In the embodied examples, as the active material of the columnar body, Si or SiOx was used, but the element is not particularly specified as far as capable of inserting and extracting lithium ions reversibly, and at least one element may be selected, for example, from the group consisting of Al, In, Zn, Cd, Bi, Sb, Ge, Pb and Sn. As active material, moreover, other material than the elements mentioned herein may be contained. For example, transition metal or 2A group elements may be contained.

In the present invention, the shape and forming intervals of convex portions formed on the current collector are not limited to the conditions mentioned in the exemplary embodiments, but the shape is not particularly specified as far as the columnar body can be formed.

In the present invention, as the electrochemical element, an example of a non-aqueous electrolyte secondary battery such as a lithium ion secondary battery is shown, but the present invention is not limited to this example. For example, same effects are obtained when applied to a capacity element such as lithium ion capacitor.

INDUSTRIAL APPLICABILITY

The electrode for electrochemical element of the present invention provides an electrochemical element such as a non-aqueous electrolyte secondary battery having high capacity, and excellent in charge and discharge cycle characteristics and high-rate characteristics. Hence, it is very useful as a secondary battery usable in portable telephone, PDA, portable electronic appliance, and large-sized electronic appliance in which a huge demand is expected in future.

The invention claimed is:

1. An electrode for an electrochemical element for inserting and extracting lithium ions reversibly, the electrode comprising:
   a current collector having a concave portion and a convex portion at least on one side of the current collector; and
   a columnar body formed on the convex portion of the current collector, wherein:
   the columnar body contains an active material for inserting and extracting lithium ions bonding at least with oxygen,
   the columnar body includes plural active material layers, and
   oxygen content ratio of each of the active material layers of the columnar body becomes smaller in a direction moving away from an interface of the current collector.

2. The electrode for an electrochemical element of claim 1, wherein the columnar body is formed obliquely on the convex portion.

3. The electrode for an electrochemical element of claim 1, wherein:
   the active material layers include one or more odd-number layers and one or more even-number layers,
   the one or more odd-number layers and the one or more even-number layers are formed obliquely, with respect to the normal direction of the current collector, and
   the one or more odd-number layers have a different growth direction from the one or more even-number layers.

4. The electrode for an electrochemical element of claim 1, wherein the active material is a material of which theoretical capacity density for inserting and extracting at least lithium ions reversibly is more than 833 mAh/cm$^3$.

5. The electrode for electrochemical element of claim 4, wherein the material is a substance expressed as SiO$_x$ containing at least silicon.

6. An electrochemical element comprising:
the electrode for an electrochemical element as set forth in claim 1;
a counter electrode for inserting and extracting lithium ions reversibly; and
a non-aqueous electrolyte.

7. A manufacturing method of an electrode for an electrochemical element for inserting and extracting lithium ions reversibly, the method comprising steps of:
forming a concave portion and a convex portion at least on one side of a current collector; and
forming a columnar body containing an active material for inserting and extracting lithium ions bonding at least with oxygen, on the convex portion, wherein
in the step of forming a columnar body, the columnar body is formed step by step so as to include plural active material layers, and
oxygen content ratio of each of the active material layers of the columnar body becomes smaller in a direction moving away from an interface of the current collector.

8. The manufacturing method of an electrode for an electrochemical element of claim 7, wherein the columnar body is formed obliquely on the convex portion.

9. The manufacturing method of an electrode for an electrochemical element of claim 7, wherein:
the active material layers include one or more odd-number layers and one or more even-number layers,
the one or more odd-number layers and the one or more even-number layers are formed obliquely, with respect to the normal direction of the current collector, and
the one or more odd-number layers have a different growth direction from the one or more even-number layers.

10. The manufacturing method of an electrode for an electrochemical element of claim 9, wherein average oxygen content ratio of an active material layers at least in the active material layers formed near an interface of the convex portion of the current collector is larger than in the remaining active material layers.

11. An electrode for an electrochemical element for inserting and extracting lithium ions reversibly, the electrode comprising:
a current collector having a concave portion and a convex portion at least on one side of the current collector; and
a columnar body formed on the convex portion of the current collector, wherein:
the columnar body contains an active material for inserting and extracting lithium ions bonding at least with oxygen,
oxygen content ratio of the active material of the columnar body becomes smaller in a direction moving away from an interface of the current collector, and
rate of change of the oxygen content ratio changes in the direction moving away from an interface of the current collector.

12. The electrode for an electrochemical element of claim 11, wherein the columnar body is formed obliquely on the convex portion.

13. The electrode for an electrochemical element of claim 11, wherein the active material is a material of which theoretical capacity density for inserting and extracting at least lithium ions reversibly is more than 833 mAh/cm$^3$.

14. The electrode for electrochemical element of claim 13, wherein the material is a substance expressed as SiO$_x$.

* * * * *